(12) United States Patent
Powers

(10) Patent No.: US 12,290,049 B1
(45) Date of Patent: May 6, 2025

(54) PET RESTRAINT AND BEHAVIOR-CORRECTING HARNESS

(71) Applicant: Troy Powers, Williamsfield, IL (US)

(72) Inventor: Troy Powers, Williamsfield, IL (US)

( * ) Notice: Subject to any disclaimer, the term of this patent is extended or adjusted under 35 U.S.C. 154(b) by 0 days.

(21) Appl. No.: 18/594,893

(22) Filed: Mar. 4, 2024

(51) Int. Cl.
*A01K 27/00* (2006.01)

(52) U.S. Cl.
CPC ................... *A01K 27/002* (2013.01)

(58) Field of Classification Search
CPC .................................................. A01K 27/002
See application file for complete search history.

(56) References Cited

U.S. PATENT DOCUMENTS

| | | | | | |
|---|---|---|---|---|---|
| 2,670,712 | A * | 3/1954 | Patience | ............... | A01K 27/002 119/856 |
| 3,994,264 | A * | 11/1976 | Flynt | ....................... | A01K 15/04 119/818 |
| 5,335,627 | A * | 8/1994 | Bandimere | .......... | A01K 27/002 119/856 |
| 5,511,515 | A * | 4/1996 | Brown | .................. | A01K 27/002 119/864 |
| 8,807,091 | B2 * | 8/2014 | Min | ...................... | A01K 27/002 119/856 |
| 10,015,950 | B1 * | 7/2018 | White | ................... | A01K 27/002 |
| 2010/0147230 | A1 * | 6/2010 | Kosanke | ............... | A01K 27/002 119/856 |
| 2010/0242861 | A1 * | 9/2010 | Arreola | ................. | A01K 27/002 119/856 |
| 2010/0263602 | A1 * | 10/2010 | Cho | ...................... | A01K 27/002 119/792 |
| 2011/0297105 | A1 * | 12/2011 | Horiuchi | ................ | A01K 15/04 119/792 |
| 2011/0308479 | A1 * | 12/2011 | Kuo | ...................... | A01K 27/002 119/863 |
| 2013/0213319 | A1 * | 8/2013 | Hoffman | .............. | A01K 1/0263 119/792 |
| 2013/0263795 | A1 * | 10/2013 | Ben Yosef | .......... | A01K 27/002 119/856 |
| 2013/0327282 | A1 * | 12/2013 | Sebo | ..................... | A01K 27/006 119/850 |
| 2015/0020754 | A1 * | 1/2015 | Flores, Jr. | ............. | A01K 15/04 119/815 |
| 2015/0090195 | A1 * | 4/2015 | Krupich | ............... | A01K 27/003 119/858 |
| 2015/0250146 | A1 * | 9/2015 | Bartol | .................. | A01K 27/005 119/856 |
| 2015/0296748 | A1 * | 10/2015 | Sporn | .................... | A01K 15/02 119/863 |
| 2018/0000353 | A1 * | 1/2018 | Thieme | .................... | A61B 5/01 |
| 2018/0303068 | A1 * | 10/2018 | Chen | .................... | A01K 27/009 |
| 2018/0343835 | A1 * | 12/2018 | Chen | ..................... | H05K 1/189 |
| 2019/0021281 | A1 * | 1/2019 | Fultz | .................... | A01K 27/008 |

(Continued)

*Primary Examiner* — Jessica B Wong
(74) *Attorney, Agent, or Firm* — Juile King

(57) ABSTRACT

The invention is an animal restraint harness, especially for dogs, made of adjustable straps and clips and buckles that provides gentle but firm restraint to the front legs of the animal through leg loops, with minimal force required from the animal's handler. The invention allows the animal to move normally yet provides instant restraint as soon as the animal outpaces its handler. The restraint provided by the leg loops is gentle on the animal yet stops them quickly so that the handler is not yanked dangerously by the animal.

4 Claims, 2 Drawing Sheets

(56) References Cited

U.S. PATENT DOCUMENTS

| | | | |
|---|---|---|---|
| 2019/0075759 A1* | 3/2019 | Sebö | A01K 27/003 |
| 2019/0124890 A1* | 5/2019 | Kath | A01K 1/0263 |
| 2021/0176966 A1* | 6/2021 | Nakano | A01K 29/005 |
| 2021/0235669 A1* | 8/2021 | Rovang | A01K 27/002 |
| 2023/0035255 A1* | 2/2023 | Rovang | A01K 27/005 |
| 2024/0138376 A1* | 5/2024 | Kilborn | A01K 27/002 |
| 2024/0147965 A1* | 5/2024 | Miller | A01K 13/006 |
| 2024/0224937 A1* | 7/2024 | Kendall | A01K 13/006 |
| 2024/0224942 A1* | 7/2024 | Pluta | A01K 27/003 |
| 2024/0407336 A1* | 12/2024 | Yun | A01K 27/002 |

* cited by examiner

PET RESTRAINT AND BEHAVIOR-CORRECTING HARNESS

BACKGROUND OF THE INVENTION

Pet harnesses typically restrain the pet by pulling on the neck or chest of the pet. Pulling on the neck of the pet can be painful and dangerous for the pet. Pulling on the chest is not as painful or dangerous for the pet as pulling on the neck, but it does little to restrain the animal beyond the ability of the person holding the attached leash to hold their ground. Pulling on the "armpits" of an animal can be painful for the animal. Pulling on the hind legs of an animal can cause the animal to trip. Furthermore, injuries to pet owners and others using such harnesses or restraints on pets are caused every day because they rely on the strength of the person holding the leash, who often gets knocked off their feet by a pet determined to bolt. This ineffectiveness often results in the animal being unrestrained and running loose, which can be dangerous for the animal and others in the vicinity if the animal is prone to attacking or biting. This invention greatly reduces the chance of injury to the pet or the person holding the leash by providing gentle but firm restraint to the front legs of the pet, causing them to be unable to bolt and thereby cause the leash holder to lose balance and unable to break away to run loose and endanger themselves or others.

DESCRIPTION

This invention utilizes restraint to the front legs of an animal, allowing for easy and total control and restraint of a chronically pulling or unruly animal, thus eliminating the stress of an out-of-control animal. Experiments with use of the invention on dogs appear to show the invention has a psychological restraint component as well, because the gentle but firm and total control by the person holding the leash end seems to calm dogs significantly versus a normal collar or standard vest/harness.

Unlike other types of harnesses/restraints, this invention has the additional benefit of operating on such little force that a person of small stature or limited strength can easily hold back the largest dog with relatively no effort or risk of harm to them or the animal.

The invention is made from a series of strapping and clips joined together to form the harness itself. The invention has two loops at one end. The animals' front legs are inserted through the loops such that the loops are positioned close to the body of the animal. The other end of the invention is the handle end for the human.

LEGEND FOR DRAWINGS

Figure 1:
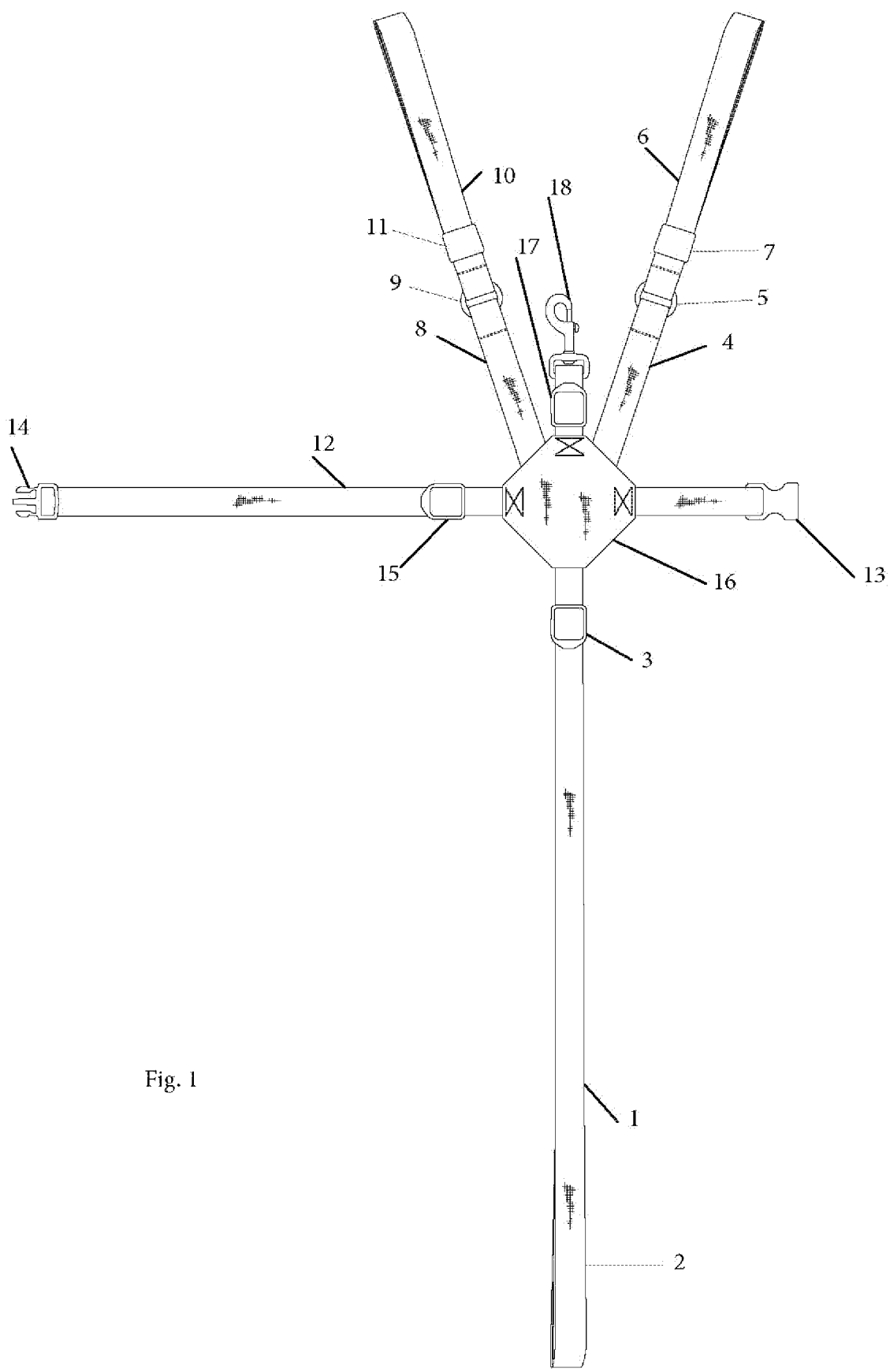
FIG. 1—A birds-eye view of the entire invention when not worn by an animal.
Figure 2:
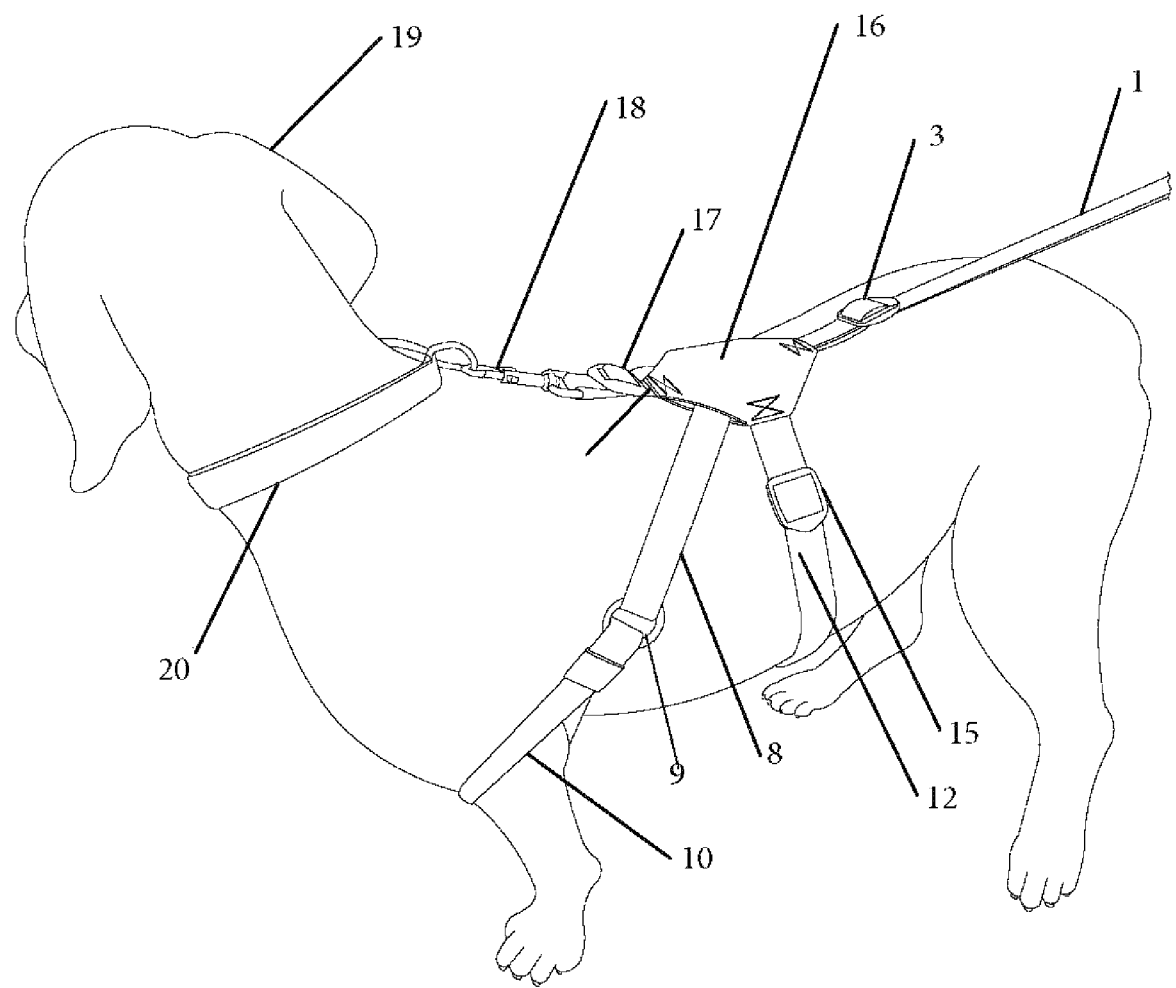
FIG. 2—A depiction of a dog wearing the invention, showing the positioning of the leg loops and chest strap.

1. Lead strap
2. Lead strap loop
3. Lead adjuster clip
4. Right leg upper strap
5. Right leg ring
6. Right leg lower strap
7. Right leg loop adjuster clip
8. Left leg upper strap
9. Left leg ring
10. Left leg lower strap
11. Left leg loop adjuster clip
12. Chest strap
13. Right chest strap buckle piece
14. Left chest strap buckle piece
15. Chest strap adjuster clip
16. Joinder area cover
17. Fastener strap
18. Fastener clip
19. Dog
20. Collar

DETAILED DESCRIPTION OF THE INVENTION

The invention is an animal restraint harness made of four or five flexible straps, all of which are preferably made of polyester strapping plastic, but which can also be made of other natural or synthetic woven material or similar material commonly used in animal restraints/harnesses, and clips and buckles preferably made of metal but which can also be made of plastic. These straps are preferably sewn together but may also be glued together. The preferred embodiments are used for this detailed description.

The lead strap (1) has a loop on one end (2) or similar mechanism for the person using the invention to use to maintain a grip on the lead. The lead is adjustable in length through a lead adjuster clip (3).

The lead strap (1) is connected as indicated below to a right leg upper strap (4) that is connected at its other end to a right leg ring (5), a sturdy ring of metal or other strong material sufficient to withstand the lead strap and right leg upper strap being pulled strongly in opposite directions without warping or breaking, by having its end looped around the right leg ring and secured back onto itself, by stitching, gluing, or other means of secure attachment. Connected in the same manner to the opposite side of the right leg ring is a right leg lower strap (6), fed through a right leg loop adjuster clip (7), then forming a loop on the other end to go around the animal's right leg. The circumference of the loop can be adjusted to fit the animal's leg through the right leg loop adjuster clip. Mirroring said components on the right, the lead strap (1) is also connected to a left leg upper strap (8) that is connected to a left leg ring (9). Connected to the opposite side of the left leg ring is a left leg lower strap (10), fed through a left leg loop adjuster clip, then looped on the other end to go around the animal's left leg. The circumference of the left leg lower strap loop can be adjusted to fit the animal's leg through the left leg loop adjuster clip (11).

The lead strap (1), right leg upper strap (4), and left leg upper strap (8) are sewed or otherwise securely joined together in a Y-shape, such that the lead forms the base of the Y and the two leg straps form the "arms" of the Y.

The invention also has a chest strap (12) sewed or otherwise securely attached perpendicularly to the lead strap (1) near where the lead strap is joined with the right leg upper strap and left leg upper strap. The chest strap has one part of a buckle, the right chest strap buckle piece (13), attached securely to the right end of the chest strap, and the reciprocal part of said buckle, the left chest strap buckle piece (14), attached to the left end of the chest strap, such that the chest strap can be positioned around the right and left sides of the torso of the animal and the ends joined across the chest of the animal by the right buckle piece and left buckle piece, to form a snug loop around the animal's chest. The chest strap can be loosened or tightened as needed using a chest strap adjuster clip (15) placed on either the left or the right part of the chest strap.

The area of the joinder of the lead strap (1), right leg upper strap (4), left leg upper strap (8), and chest strap (12) is covered by a fabric or leather joinder area cover (16). The joinder area cover is two identical pieces of fabric or leather, one placed above the joinder of the lead strap, left leg upper strap, right leg upper strap, and chest strap, and the other placed below said joinder, such that said joinder is sandwiched between said two pieces of the joinder area cover. Said two pieces of the joinder area cover are sewn together along the outside edges, or otherwise securely attached together, with one opening allowing the lead strap to exit, two openings opposite the lead strap opening for the left leg upper strap and right leg upper strap to exit, Said joinder area cover helps prevent the joinders from rubbing unpleasantly on the animal and provides a more aesthetically pleasing appearance.

The invention has an optional fifth strap, a fastener strap (17) that is sewn or otherwise securely attached at one end to the other straps within the joinder cover and extends only a small distance between the left leg upper strap and the right leg upper strap. At the other end of the fastener strap is a fastener clip (18) for attaching to the animal's regular collar.

An alternate embodiment is having the right leg lower strap and left leg lower strap joined directly to the lead strap, eliminating the right leg upper strap, right leg ring, left leg upper strap, and left leg ring.

Another alternate embodiment is having the lead strap be short with a fastener at the user end instead of a loop, like the fastener strap and fastener clip, such that the lead strap can be attached to the user's own leash that will serve as the full lead.

To use the invention, the chest strap is secured around the chest of the animal, such as a dog (19). The animal's right front leg is placed through the loop of the right leg lower strap, and the animal's left front leg is placed through the loop of the left leg lower strap, such that the loops fit on the tops of the animal's legs up near the animal's chest. The loops should not be tight around the animal's legs and should instead allow the animal to walk normally. The tightness of the loops is adjusted using the right leg loop adjuster clip and left leg loop adjuster clip.

If the animal pulls suddenly, as long as the user maintains their hold on the lead strap, the loops of the right leg lower strap and left leg lower strap pull around the animal's front legs, providing a resistance and motion of pulling the animal's legs toward their chest that stops the animal from running. The harder the animal pulls, the more resistance the loops provide. If the animal continues pulling, it will end up on its chin because the legs will be pulled in tight to its chest.

After being trained with repeated use of the invention, the animal experiences the psychological effect of the invention, anticipating the correction provided by the invention, and no longer tries to bolt.

What is claimed is:

1. A harness for an animal comprising:
   a lead strap to be held by the animal's handler like a regular animal lead;
   a right leg upper strap attached at one end to the animal end of said lead strap and at the other end to a right leg ring, to which is attached a right leg lower strap fed through a right leg loop adjuster clip, then forming a loop through which the animal's right front leg is placed, with said right leg loop adjuster clip allowing for adjustment of said loop to fit the animal's right leg loosely enough to permit the animal's normal walking gait;
   a left leg upper strap attached at one end to the animal end of the lead strap and at the other end to a left leg ring, to which is attached a left leg lower strap fed through a left leg loop adjuster clip, then forming a loop through which the animal's left front leg is placed, with said left leg loop adjuster clip allowing for adjustment of said loop to fit the animal's left leg loosely enough to permit the animal's normal walking gait;
   a chest strap attached in its middle to the animal end of said lead strap, that goes around the animal's chest behind its front legs, to which is attached a chest strap adjuster clip to allow adjustment of said chest strap to fit the animal snugly, and having a right chest strap buckle piece and a left chest strap buckle piece that connect to secure said chest strap around the animal; and
   a joinder area cover comprising two pieces of fabric joined together such that said two pieces of fabric cover and are securely attached to the top and bottom of the attachments of said lead strap to said right leg lower strap, said lead strap to said left leg lower strap, and said lead strap to said chest strap, such that said attachments are sandwiched between said two pieces of fabric.

2. A harness for an animal comprising:
   a lead strap to be held by the animal's handler like a regular animal lead;
   a right leg lower strap attached at one end to the animal end of said lead strap and having a loop at the unattached end, through which the animal's right front leg is placed, and a right leg loop adjuster clip that allows for adjustment of said loop made by said right leg lower strap to fit the animal's right leg loosely enough to permit the animal's normal walking gait;
   a left leg lower strap attached at one end to the animal end of said lead strap and having a loop at the unattached end, through which the animal's left front leg is placed, and a left leg loop adjuster clip that allows for adjustment of said loop made by said left leg lower strap to fit the animal's left leg loosely enough to permit the animal's normal walking gait;
   a chest strap attached in its middle to the animal end of said lead strap, that goes around the animal's chest behind its front legs, to which is attached a chest strap adjuster clip to allow adjustment of said chest strap to fit the animal snugly, and having a right chest strap buckle piece and a left chest strap buckle piece that connect to secure said chest strap around the animal; and
   a joinder area cover comprising two pieces of fabric joined together such that said two pieces of fabric cover and are securely attached to the top and bottom of the attachments of said lead strap to said right leg lower strap, said lead strap to said left leg lower strap, and said lead strap to said chest strap, such that said attachments are sandwiched between said two pieces of fabric.

3. A harness as in claim 1 or claim 2, further comprising a fastener strap attached at one end to the animal end of said lead strap and having a fastener at its other end to attach to the animal's regular collar.

4. A harness as in claim 1 or claim 2, in which said lead strap is short and has, at the user end, rather than a loop, a fastener clip for attaching to the user's own leash.

\* \* \* \* \*